United States Patent [19]

Temple, III

[11] Patent Number: 4,764,865

[45] Date of Patent: Aug. 16, 1988

[54] CIRCUIT FOR ALLOCATING MEMORY CYCLES TO TWO PROCESSORS THAT SHARE MEMORY

[75] Inventor: Joseph L. Temple, III, Kingston, N.Y.

[73] Assignee: International Business Machines Corp., Armonk, N.Y.

[21] Appl. No.: 390,428

[22] Filed: Jun. 21, 1982

[51] Int. Cl.[4] .......................... G06F 3/00; G06F 13/00

[52] U.S. Cl. ...................................................... 364/200

[58] Field of Search ........ 364/200, 900, 200 MS File, 364/900 MS File

[56] References Cited

U.S. PATENT DOCUMENTS

| | | | |
|---|---|---|---|
| 3,609,700 | 9/1971 | Wollum | 364/200 |
| 3,715,729 | 2/1973 | Mercy | 364/200 |
| 3,810,110 | 5/1974 | Kotok et al. | 364/200 |
| 3,921,145 | 11/1975 | Emm et al. | 364/200 |
| 4,065,809 | 12/1977 | Matsumoto | 364/200 |
| 4,164,787 | 8/1979 | Aranguren | 364/200 |
| 4,354,227 | 10/1982 | Hayes, Jr. et al. | 364/200 |
| 4,422,142 | 12/1983 | Inaba et al. | 364/200 |

*Primary Examiner*—Gareth D. Shaw
*Assistant Examiner*—D. Dorsey
*Attorney, Agent, or Firm*—W. S. Robertson

[57] ABSTRACT

A circuit for allocating main memory cycles between two data processors has means for making the allocation by either of two procedures. In one procedure, control of memory is transferred only after a request for memory access has been made. In a second procedure, transfer of memory control to a requesting processor is automatically accompanied by a request to return control. The control memory of a processor selects the process by two bits called Code Idle and Code Release. Code Idle accompanies instructions that usually mean that the releasing processor will not need memory for several memory cycle times, and an explicit request for transfer is made when memory is actually needed. Code Release accompanies instructions that do not require memory access at the time but are typically followed by a memory request within a processor cycle time or a few processor cycle times. Memory control is returned without the delay that is associated with an explicit request.

7 Claims, 4 Drawing Sheets

CIRCUIT FOR ALLOCATING MEMORY CYCLES TO TWO PROCESSORS THAT SHARE MEMORY

FIELD OF THE INVENTION

This invention relates to a data processing system in which two processors share a main memory. More specifically, the invention relates to a circuit that allocates memory cycles to each processor.

INTRODUCTION

Circuits are well known that allocate memory cycles to two different processors, but it will be helpful to review the features and the terminology that particularly apply to this invention. Some of these features can be illustrated in a single processor system. In a single processor system, a data bus interconnects registers of the memory with registers in the processor, and an address bus connects a memory address handling circuit in the memory to receive an address from a register in the processor. There is also a control bus that the processor uses to send a select signal to the memory to start a memory cycle. The memory may use this bus to signal status to the processor, for example that the memory is busy or that there is valid data on the data bus.

The processor also operates with a control memory (or with equivalent sequential logic circuits) that is accessed for a control word (also called a microcode word) that contains a bit pattern that sets the gates of the processor to a particular state. A sequence of these control words steps the processor gates through a sequence of states for a particular operation such as fetching a data word from the main memory. When the processor decodes an instruction, it uses the Operation code of the instruction as an address to access the control memory at the appropriate location for the first control word in a control program routine for the instruction. At the end of the control program routine for one instruction, the processor branches to a location in the control memory for a control program routine to fetch the next instruction from main memory. The control word as it has been described so far is also combined with status bits to permit branches in the control program.

The cycle time of the main memory is ordinarily longer than the cycle time of the control memory and it may be an integral number of the control memory cycle times, for example, twice as long in the system that will be described to illustrate this invention. In this example, some processor instructions are executed in three or a small number of cycles, and some require a few times as many cycles. Thus, in a sequence of memory accesses, the memory operates in synchronism with the processor, beginning a next memory cycle at a corresponding point in the clock cycle of the processor when the processor raises the memory select signal. When two processors share memory, each processor alternates between memory accessing instructions and arithmetic and logic unit instructions, and the memory operations of each processor can more or less fit into the times for the arithmetic and logic operations of the other processor.

THE PRIOR ART

In a multi-processor system, the memory address bus and the memory data bus have gates that connect these busses to a particular one of the processors, and an allocation circuit is provided for permitting only one of the processors to be connected to the memory busses for a memory cycle time. Ordinarily, a memory allocation circuit has a latch that is set to enable the gates in the bus of one processor and is reset to enable the gates of the other processor. The latch is switched whenever control of memory is to be switched between the processors.

As an introductory example of a memory allocation circuit, the two processors may be assigned alternate cycles of the memory. If the processors are carefully synchronized, the processors can access memory with no delay in switching the control of memory from one processor to the other. A general object of this invention is to provide a new and improved memory allocation circuit that works well with two processors that are not precisely synchronized. This object is important in a system of two processors that have separate clocks that are only approximately at the same frequency. It is also important for a system of two processors that are mounted on separate boards and are interconnected by relatively long cables that introduce delays in propagating the clock signals and thereby cause significant skews in clocks. It is also generally important in multiprocessor systems because when the circuits are made faster, it is more difficult to maintain two processors in synchronism.

In one technique for reducing the switch-over time, the processor that has requested access to memory is signalled slightly before the end of the last memory cycle by the other processor so that the requesting processor can raise its select signal as soon as possible (Mercy U.S. Pat. No. 3,715,729).

SUMMARY OF THE INVENTION

It will be convenient to call the two processors "A" and "B" when referring to both of them in some combined operation. In these examples, either processor A or processor B may be identified as having access to memory or as not having access to memory. In a more generalized description, the two processors will be called the "requesting processor" and the "controlling processor" or the "releasing processor". This circuit operates to switch memory control from one processor to the other only after a request for memory access has been made by the requesting processor and the release has been granted by the controlling processor. Preferably, but optionally, the controlling processor does not release memory until it has decoded an instruction for a non-memory operation. The circuit performs the transfer of memory control by either of two procedures. In one procedure, a processor signals a request for the memory access when it decodes an instruction that requires memory access or when it branches to instruction fetch in its control program. In the second procedure, the request is made automatically as part of the release signal procedure. The two procedures are defined by the control program of the releasing processor. The control program routines are coded with two bits that will be called "Code Idle" and "Code Release". The logic function Code Idle+Code Release=0 defines a conventional memory request that would otherwise be coded by a single bit in the control memory. Code Idle signifies that a subsequent memory access is not required for some indefinite (but probably long) number of memory cycles. Code Release signifies that a subsequent memory access will probably be required within a memory cycle or so. Some examples will help to explain the significance of this circuit and operation.

An example of Code Idle is in an instruction to multiply the contents of two registers. This operation does not require memory access because registers of the processor have already been loaded with operands from main memory. In addition, the multiply operation is performed as a sequence of additions and shifts, and it typically takes a relatively large number of processor cycles. The time for this operation is typically long enough that the other processor may operate to access memory, process the operands, and then access memory again. In this situation, it is an advantage to have the other processor retain control of memory even while it is not actually making access to memory.

An example of Code Release is in the control program routine to fetch an instruction. The instruction being fetched may be the multiply instruction of the preceding example so that the current memory access will be the last access by the processor for several cycles, but there is a significant likelihood that it will be another access to memory to fetch operands. During the instruction fetch in this example, the processor that controls memory sends a signal Code Release to the other processor (if the other processor has signalled a request for memory access) and the releasing processor then immediately signals a request for memory access. If the other processor takes only one memory cycle, control of memory is returned as soon as possible. Means is also provided to cancel this automatic request if the next instruction is in fact one that has the Code Idle bit. Other examples will be presented later.

In the circuit that will be described, each processor has a latch that will be called a control latch that is set to give control of memory to the associated processor or reset to give control of memory to the other processor. Thus, these two latches provide the conventional control function that is provided by a single latch in the description of the prior art. Each processor also has a latch called a request latch that is set by the other processor to signal that the other processor requires access to memory. This latch in the releasing processor is reset when the requesting processor gets access to memory. Each processor also has a latch that will be called a Release Latch that is set to switch control of memory to the other processor for an indefinite number of memory cycles in response to the control memory bit Code Idle and the set state of the request latch. Each processor also includes gating the timing means that responds to Code Release to set the control latch of the other processor and then to set the request latch so that memory control can be returned on the next cycle.

The apparatus that will be described in detail has other features and advantages that will illustrate more general aspects of the invention.

THE DRAWINGS

THE APPARATUS OF THE DRAWING

Figure 1:
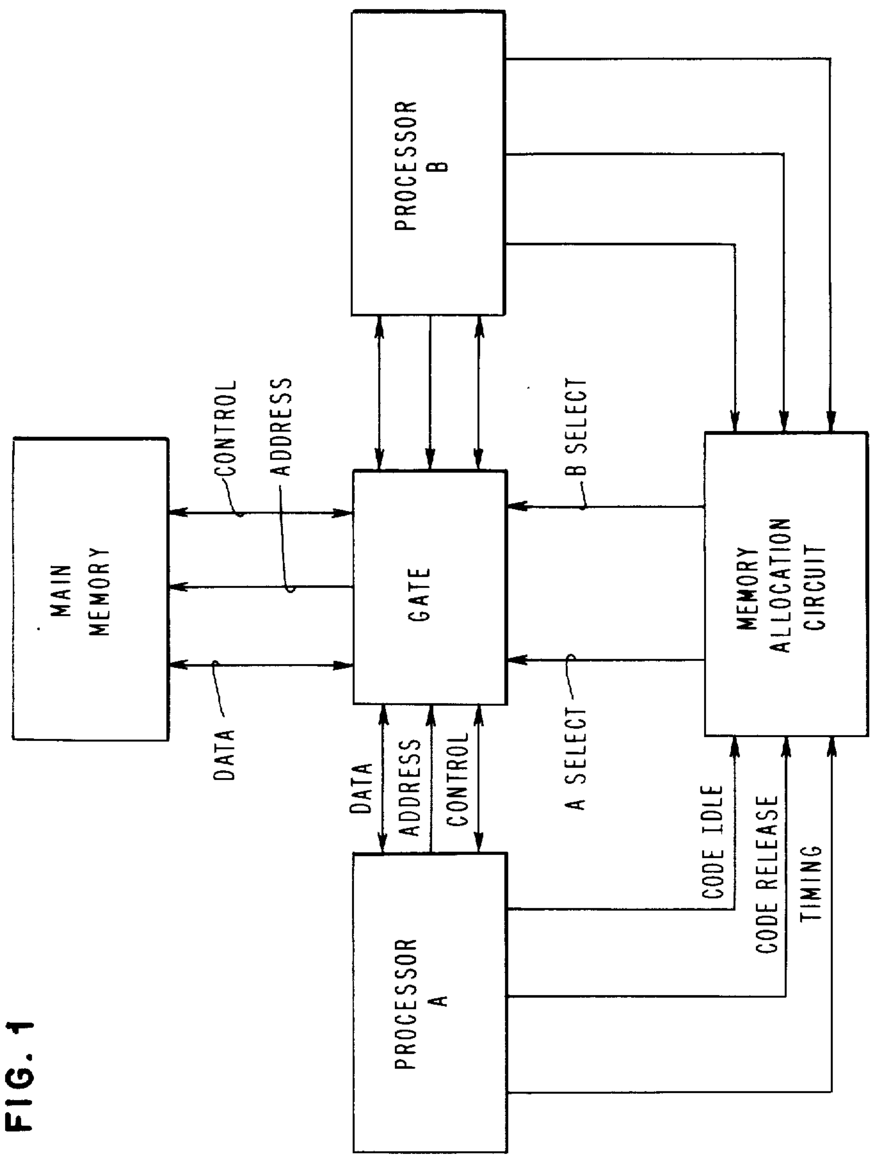
FIG. 1 is a block diagram showing the memory allocation circuit of this invention and other components of a data processing system.

Introduction—FIG. 1

FIG. 1 shows two processors A and B that share a main memory. A gate circuit selectively connects the memory data bus, address bus and control bus to the corresponding busses of the processors. A memory allocation circuit receives a memory request signal from the processors and controls the gates to give memory access to a selected one of the processors. (In the more detailed description later, the allocation circuit will be described from the viewpoint of a separate set of components associated with each processor.) The allocation circuit also sends a select signal on the control bus to the memory to start a memory cycle. These components and interconnections are conventional in the broad way in which they have been described and they illustrate a wide variety of applications for the circuit of this invention. FIG. 1 also shows the signals Code Release and Code Idle which originate in the control memory of a processor. It also shows timing signals that are formed by each processor and are used by components of the allocation circuit.

Figure 2:
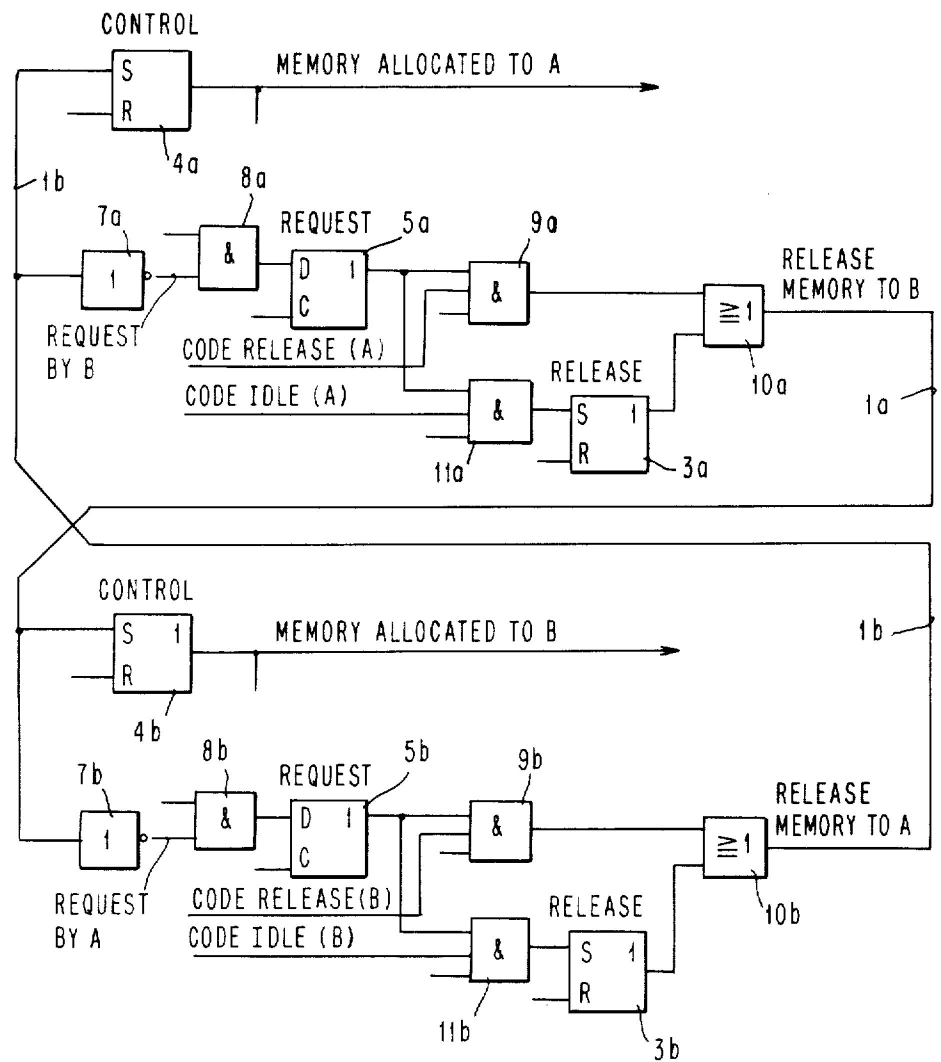
FIG. 2 is a partial logic diagram showing the interconnection between the memory allocation circuits of two processors.

An Overview—FIG. 2

FIG. 2 is a simplified view of the memory allocation circuit that shows the general flow of information in the circuit and the interconnections with other components. Line fragments are shown to indicate the relation of FIG. 2 to the more detailed circuit of FIG. 3. Ordinarily, the allocation circuit will be constructed as separate identical circuits for processors A and B, and the circuit for A is shown in the upper part of FIG. 2, and the circuit for B is shown in the lower part. Letter subscripts "a" and "b" designate components for a particular processor A or B.

Each processor separately produces signals Code Release and Code Idle. Code Release has an up level (arbitrarily) and a 1 logic level when the current instruction that is being executed does not require memory access but is likely to be followed by an instruction that does require memory access. Code Idle has a 1 logic level when the current instruction does not involve memory access and is not likely to be followed within about a memory cycle time by an instruction that does require memory access. The function Code Idle + Code Release = 0 is a request for memory access. The bits Code Idle and Code Release are part of the microcode and values of these bits are assigned on the basis of the statistical frequency that a particular microcode sequence that does not require memory is followed by a microcode sequence that does require memory. Stated from a different viewpoint, if all of the microcode routines were coded to transfer memory control by Code Idle, the operation would be slowed because a releasing processor executing certain instructions would be required to wait while its memory request signal was processed by the other processor and memory control was returned. Conversely, if all transfer were handled by the Code Release procedure, the operation would be slowed by unnecessary transfer of control of memory.

Each processor has a latch 4a, 4b that is set to give control of memory to the associated processor when the latch is set. The function of these latches is conventional in the simplified form of the circuit in FIG. 2. Latch 4a is set by a signal Release Memory to A on line 1*b*, and latch 4*b* is set by a corresponding signal from processor A.

The signal Release Memory on line 1*a* or 1*b* falls to a 0 logic level to signal that the corresponding processor requests memory access, and this signal is transmitted through gates 7*a* or 7*b* and 8*a* or 8*b* to set a latch 4*a* or 4*b*. The set state of latch 4*a* or 4*b* signals that the other processor, B or A respectively, has requested a transfer of control of memory.

A latch 3*a* or 3*b* is set to release memory to the other processor in response to the coincidence of the set state of the associated request latch and the signal Code Idle from the associated control memory. A gate 11*a* or 11*b* performs the input logic for the latch and a gate 10*a* or 10*b* couples the latch output to the line 1*a* or 1*b*.

Gate 10*a* or 10*b* cooperates with an AND gate 9*a* or 9*b* to produce a signal Release Memory on line 1*a* or 1*b* on the coincidence of a request for transfer and the bit Code Release. This signal is not latched and it appears on line 1*a* or 1*b* as a pulse, as will be explained in more detail. The logic functions that have just been introduced are shown as legends on the signal lines in the more detailed diagram of FIG. 3.

Figure 3:
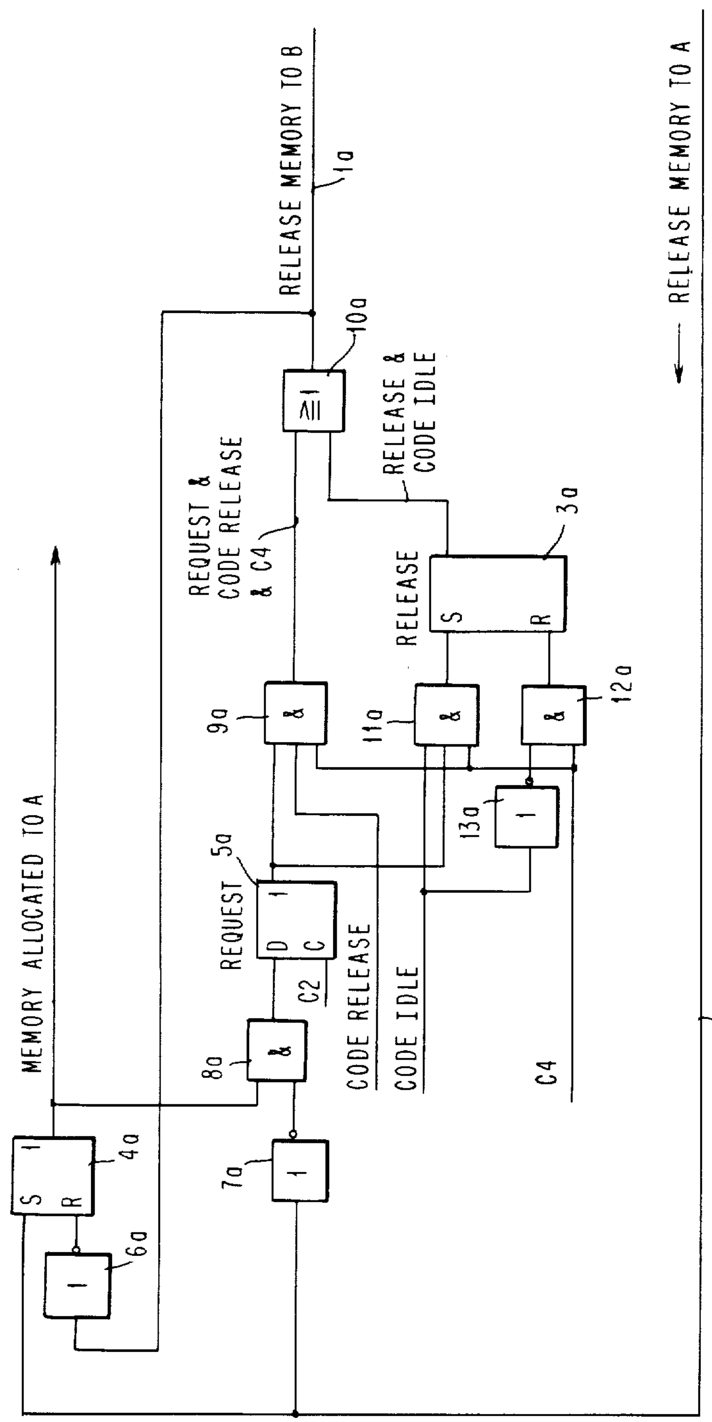
FIG. 3 is a more detailed logic diagram of the memory allocation circuit for one processor.

The Circuit of FIG. 3

FIG. 3 is a more detailed drawing of the memory allocation circuit for processor A. The input lines, the output lines and the latches will be familiar from the introductory description of FIG. 2. The other components will be introduced as they appear in descriptions of the operation of the circuit.

Each processor has a conventional clock that operates through cycles of four clock times that are called C1, C2, C3 and C4. For some operations that will be described, each clock time is further divided into half. These four times make up a processor cycle or equivalently a control memory cycle and in the specific system that is being described two control memory cycles take as long as one main memory cycle. (As previously explained, the operations of the processor to access memory take two processor cycles.)

Note that latch 5*a* is a D type latch that is set or reset according to the binary value of a signal at a data input D at a time when a signal is up at a clock input C. Gates 11*a* and 12*a* similarly control the latch 3*a* to be set or reset at a clock time C4. The actual times and time relationships that have been presented only to make the operation examples easy to understand, and the invention will be useful in systems with various timing arrangements.

Figure 4:
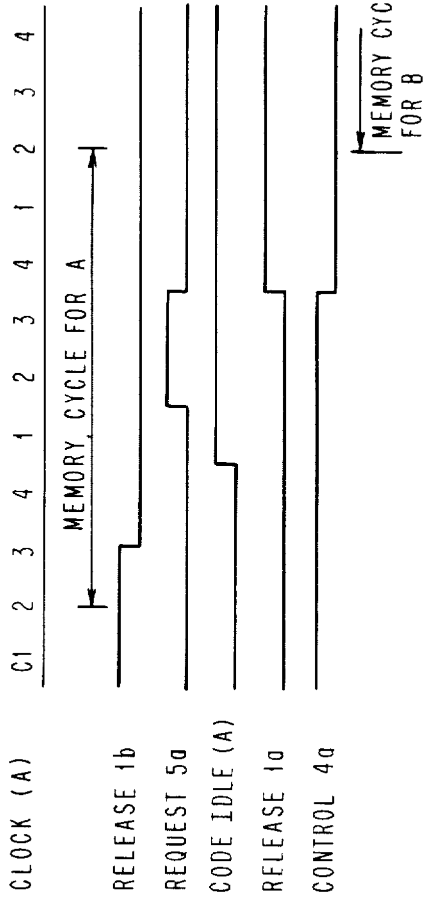
FIG. 4 is a timing chart illustrating the Code Release process.

Operation With Code Idle—FIG. 4

FIG. 4 shows a series of timing waveforms that illustrate the use of the Code Idle bit. At the beginning of the example, the control latch 4*a* is set to give control of memory to A. Conventional circuits that are not shown in the drawing respond to the set state of latch 4*a* and to the A clock, and at the midpoint of C2 time processor A raises its select signal to begin a memory cycle. This memory cycle runs through two processor cycle times and ends at the midpoint of the second next C2 time. At the beginning of the example, processor B does not need memory (Code Idle(B)=1) and line 1*b* is up and the request latch 5*a* remains reset. Similarly, processor A requires memory and its line 1*a* is down. Processor B encounters a need for memory access and drops line 1*b* to set latch 5*a* at the next C2 time. Since the clocks of A and B are not synchronized, the fall of line 1*b* can occur at any time with respect to the clock of A, and the timing of FIG. 4 is arbitrary. Also, FIG. 4 illustrates the example in which A releases the next memory cycle, but in the general case A may continue to take several memory cycles before releasing memory.

In the interval between the start of the memory cycle for A and the second C4 time, A has decoded an instruction that has caused Code Idle(A) to rise. An AND gate 11*a* detects the coincidence of Code Idle(A), C4 time, and the request at the output of latch 5*a*, and gate 11*a* sets latch 3*a* which raises the signal Release Memory to B on line 1*a*. The signal on line 1*a* also resets latches 4*a* and 5*a*. Resetting latch 4*a* takes control of memory away from A and resetting latch 5*a* signifies that B has not made a request for memory control since control was transferred to B as the result of a previous request.

While processor B waits for memory control after dropping the signal on line 1*b*, it stops its clock at a position to restart with the rise of the C2 timing pulse. In the interval that starts with the rise of Release to B on line 1*a* and ends with the midpoint of C2 time when the memory cycle for A ends, conventional circuits in B are able to detect the set state of latch 4*b* and to restart the B clock and raise the Memory Select signal on the memory control bus. The switch over is not instantaneous because the output of latch 4*a* or 4*b* is propagated through two latch stages (not shown, but conventional) to avoid a problem of latch metastability that may occur when communicating components are not otherwise synchronized. B then accesses memory for one or several memory cycles until a request has been made by A and B no longer needs memory.

Figure 5:
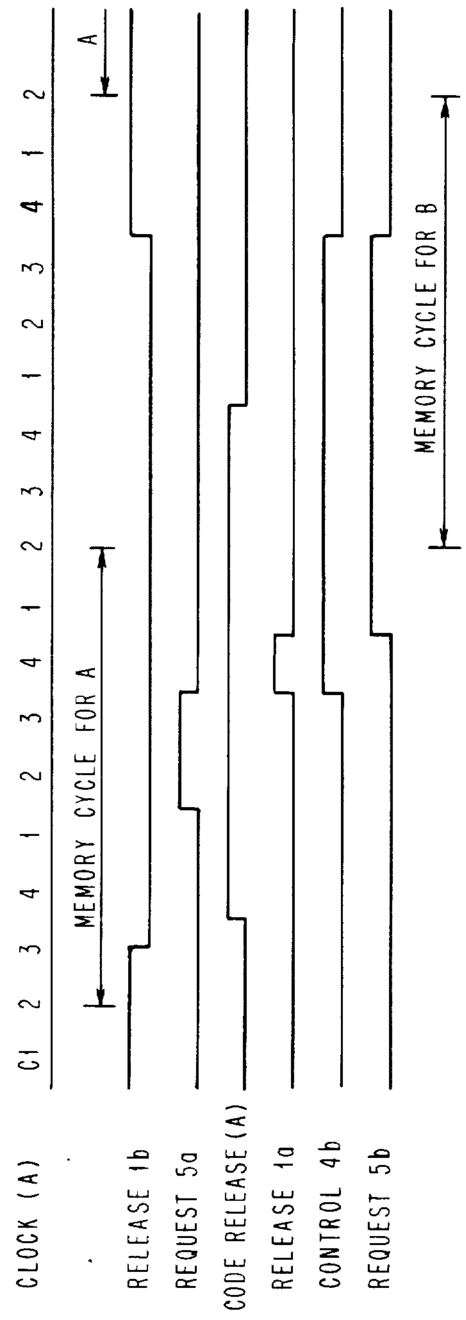
FIG. 5 is a timing chart illustrating the Code Idle process.

Operation of Code Release—FIG. 5

The example of FIG. 5*a* begins in the same way that has been described for the example of FIG. 4. However, in this example, the release to B is enabled by the bit Code Release (A), and the signal on line 1*a* is a pulse having the timing of a C4 pulse of the A processor clock. In response to the rise of this pulse, latch 4*b* sets and latches 4*a* and 5*b* are reset as in the previous example. However, on the fall of the pulse, latch 5*b* is again set. Thus is a request for access by A is registered before A actually decodes an instruction that may or may not require memory access.

FIG. 5 shows the example in which B raises release on line 1*b* during the first memory cycle and A makes access to memory or for next cycle. Alternatively, B may keep control of memory by not raising release and/or A may decode an instruction that causes Code Idle to rise on line 1*a* and causes latch 5*b* to reset.

As a modification of the example of FIG. 5, suppose that Code Release rises in processor A at a time when Release Memory to A is still up on line 1*b*. In this situation Request latch 5*a* is still reset and gate 10*a* is closed so that the release pulse does not appear on line 1*a* as in the example of FIG. 5. If B requires a memory access while Code Release is up in A, latch 5*a* sets at C2 time and gate 10*a* is opened to transmit a release pulse to B at the next C4 time, as in the example of FIG. 5.

Several common operations involve two processor cycles in which one memory access is made and then two subsequent processor cycles or non-memory operations and then a next instruction fetch. If processor A is in such a sequence and processor B has already requested access to memory, B may make a single access to memory during the third and fourth processor cycles of A in the optimum example, as in FIG. 5. If B requests memory during the third processor cycle of A, B can make a single access to memory during the fourth processor cycle in A and in a next processor cycle in which A must wait for memory access as in the modification of FIG. 5 described in the preceding paragraph. Thus in the second of these examples, the invention reduces the time that memory is unused when both processors are accessing memory in a non-optimum situation.

OTHER EMBODIMENTS

The circuit can be adapted easily to modified operations. As one example, each processor may have conventional means for operating as a data channel. A beginning channel operation is a further example of microcode instruction sequences that do not require memory for several cycle times. Conversely, while data is transferred between main memory and an I/O device, one processor makes intensive use of memory. Preferably, each circuit includes a latch that is set by microcode that identifies a data transfer for an I/O operation. When the latch is set, the lines 1*a* and 1*b* are switched to give the next memory cycle to the processor that is performing the channel operation, even if this processor has not release memory. In some systems, only one processor has attached devices and the other processor does not execute channel instructions. In this situation, only one processor is programmed to execute instructions that access control program routines that cause this switch in memory control. If both processors have attached devices, this modified circuit causes control of memory to pass back and forth so that the two processors advantageously take alternate memory cycles.

Other modifications of the circuit will be apparent within the spirit of the invention and the intended scope of the claims.

Having thus described my invention, what I claim as new, and desire to secure by Letters Patent is:

1. In a multiprocessor system having two processors and a shared memory in which each processor has means for requesting access to the shared memory and means such as a control memory for controlling the processor through a plurality of operations, some operations requiring access to the shared memory and some not requiring access to the shared memory, the operations not requiring access to the shared memory being classifiable as not requiring access for a longer time for a shorter time, improved apparatus for allocating memory cycles between the two processors, comprising, for each processor, means for signalling a request for memory access that has been made by the other processor, means in said controlling means for providing a first signal for said operations not requiring memory access for a shorter time or a second signal for said operations not requiring memory access for a longer time, means responsive to the coincidence of a request signal from the other processor and said first signal from said controlling means for releasing access to said shared memory to the other processor with an accompanying request for access to memory and responsive to the coincidence of a request signal and said second signal for releasing memory to the second processor without an accompanying request for access to memory.

2. The system of claim 1 wherein said control means includes means providing said first signal for operations that can be performed optimally by overlapping a memory access by one processor with a non-memory operation by the other processor and by allocating memory to the processors alternately.

3. The system of claim 2 wherein said means for signalling comprises a request signifying latch and means connecting said latch to be set in response to a request for memory access by the second processor and to be reset in response to the allocation of a memory cycle to the second processor.

4. The system of claim 3 wherein said means for releasing memory comprises a release signifying latch, means for setting said latch in response to the coincidence of a request by said second processor and said second signal, and means for resetting said release latch in response to the absence of said second signal.

5. The system of claim 4 including control latch means connected to allocate memory cycles to one processor in one latch state and to the other processor in the other latch state and means for connecting said releasing means to said control latch means to transfer control of memory to said second processor in response to the coincidence of a request by said second processor and said first or second signal and for additionally setting the request latch of said second processor in response to said first signal.

6. The system of claim 5 wherein said means connecting said releasing means to said control latch means includes a signal line having one binary level signifying memory release and the opposite binary level signifying a memory request.

7. The system of claim 6 wherein said releasing means includes means responsive to the coincidence of said request signal and said first signal to form a release signal as a pulse having a binary level to signify memory release followed by a binary level to set the request latch of the second processor.

* * * * *